UNITED STATES PATENT OFFICE 2,683,675

PROCESS OF TREATING METAL WITH AN AQUEOUS SLURRY

Adolph W. Machlet, Elizabeth, N. J.

No Drawing. Application November 14, 1951,
Serial No. 256,380

2 Claims. (Cl. 117—130)

This invention relates to the improvement in the properties of metals, particularly with respect to hardness and toughness, by treatment with an aqueous slurry of a material containing a metal element of group IV of the periodic system.

In my previously issued Patents Nos. 2,529,344, 2,529,345, and 2,551,957, I have disclosed treatment of metals, particularly ferrous metals, with a material known as red mud obtainable as a by-product of the aluminum industry. The composition of this red mud varies, depending on the ore treated and other factors. Recent analyses of three samples of red mud obtained from different sources are given as follows:

|  | Percent | | |
| --- | --- | --- | --- |
|  | No. 1 | No. 2 | No. 3 |
| $Al_2O_3$ | 18–25 | 21.21 | 21.13 |
| $Fe_2O_3$ | 13–20 | 32.42 | 10.99 |
| $SiO_2$ | 10–15 | 14.85 | 19.28 |
| $CaO$ | 10–18 | 1.95 | 13.10 |
| $TiO_2$ | 7–12 | 8.05 | 3.56 |
| $Na_2O$ | 4–7 | 9.36 | 11.85 |
| $SO_3$ |  |  | 2.50 |
| Loss on ignition | 14–17 | 10.21 | 15.59 |

In the aforesaid patents, there are described methods whereby metals, particularly ferrous metals such as iron and steel, are improved with respect to corrosion resistance and other properties by heating said metals in a mixture of the aforesaid red mud admixed with comminuted charcoal, to temperatures in the neighborhood of 850° F. to 1600° F.

I have now found that improvements in metal properties may be effected without the use of heat by a "cold alloying" type of treatment employing an aqueous slurry of a material containing a metal element of group IV of the periodic system. As is apparent from the aforesaid analyses, red mud contains appreciable amounts of titanium.

In the preferred method employing my invention, I mix intimately a red mud together with carbon, preferably charcoal, in the ratio of about 100 parts by weight of red mud to about 40 parts by weight of No. 10 charcoal. The mixture is then heated to approximately 1500° F., and this temperature is maintained for a few hours. Thereafter, the mixture is allowed to cool.

In order to treat metal articles, the red mud, processed in the aforesaid manner, is mixed with water to produce a slurry, and the metal sample is immersed in this slurry and allowed to stand in contact therewith for about 12 to 24 hours.

I have found that there exists a difference in electrical potential between the treating compound and the metal being treated and that this potential results in the alloying of the metal present in the slurry compound with the metal treated to the extent that the treated metal is penetrated completely with the alloying ingredients, thereby being altered throughout the entire cross section of the treated metal. Furthermore, I find that this alloying effect is not restricted to the portion of the metal immersed in the slurry, but that the alloying components from the slurry are "soaked up" into the portion of the metal extending or protruding beyond the immersed portion, the action being a diffusion of a liquid into the pores of a solid akin to the soaking up of water by means of a blotter.

I have further found that when iron or steel is treated in accordance with my invention, and the metal is allowed to be subjected to the corrosive action of air and water vapor, there is no rusting as a result, but rather there results a formation of a "galvanic ash" which is produced by impurities present in the metal and which is different from rust in that its formation does not substantially alter the important properties of the treated metal.

Although metals such as copper, brass, bronze, etc. may be treated in this manner, I find that the process is particularly adapted to improving hardness and toughness characteristics of iron and steels, as well as stainless steels. The process is a simple one and does not require heating or other expensive processing operations. The amount of comminuted carbon to be used with the red mud may be varied from 1 part of carbon to 10 parts of mud, to 1 part of carbon to 1 part of mud, although a carbon-to-mud ratio of about 1 part of carbon to about 2½ parts of mud is preferred. Also, it is preferred that the heating of the carbon-mud mixture be done in the absence of air or oxygen and in a closed container. The amount of water employed to make the slurry for treatment may vary roughly from 2 parts by volume of water to 1 part of treated mud, to 100 parts of water to 1 part of mud, or even greater. The treating temperature of the slurry is preferably ambient room temperature. I may add a small amount of surface active compound to the slurry in order to facilitate penetration into the metal being treated.

The improved properties of the treated metals may be observed by rubbing the exposed treated metal with a knife-edge of hard metal. It will be apparent that hardness and toughness characteristics are improved considerably. The treated metals also take on a bright and glossy polish when subjected to a slight buffing operation.

The red mud-carbon mixture may be heated to 850° F. to 1600° F., although a temperature of about 1500° F. is preferred and found to be the most effective. Also, when this heated mixture is allowed to cool, it is desirable to effect the cooling in the absence of air or oxygen.

I find, also, that satisfactory treatment of metals may be obtained by eliminating the heating operation. In other words, the material containing a metal element of group IV of the periodic series, such as red mud, zirconia, stannic sulfate, lead nitrate, thorium chloride, or the like, is merely mixed with a comminuted carbon, such as powdered charcoal, carbon black, or the like, and water is added to produce a thin slurry. Then the metal article, such as a steel bar, bronze object, or the like, is immersed in the slurry and allowed to stand therein for 10–24 hours, whereupon a change in the treated metal takes place at ambient temperature.

I find that a mixture of 50% carbon and 50% material containing an element of group IV gives the best results, although it is possible to employ as high as 75% by weight of carbon, and as low as 10% by weight of the solid treating mixture.

I have found that granulated zircon (zirconium silicate) is an excellent improving agent for lower quality metals. When intimately mixed with a 50–50 proportion (by weight) of granulated charcoal, and made up to a thin slurry with water, it is possible to immerse in this slurry pieces of cast iron, bronze, brass, iron or steel, in the form of nails, hardware, screws, hinges, firearms parts, jig parts, machine tools, carpenter tools, and the like and to effect an improvement in the physical properties thereof.

When the treatment is to be done at a distant location, I find it convenient to prepare the dry treating composition composed of powdered charcoal and powdered treating agent containing a metal element of group IV such as zirconium silicate, and to ship this dry treating powder to the treating location at which place the powder may be made into a slurry by adding water.

I claim:

1. The process of improving the physical characteristics of a metal comprising treating said metal at room temperature with an aqueous slurry of red mud by-product of alumina from which aluminum has been extracted and which said red mud had been heated to about 850° F. to 1600° F. in presence of comminuted carbon dispersed therewith.

2. The process according to claim 1 in which the red mud has been heated and cooled in the substantial absence of oxygen.

References Cited in the file of this patent

UNITED STATES PATENTS

| Number | Name | Date |
|---|---|---|
| 379,438 | Baldwin | Mar. 13, 1888 |
| 1,649,386 | Blumenbarg | Nov. 15, 1927 |
| 2,112,931 | Schulze | Apr. 5, 1938 |
| 2,168,638 | Wilkerson | Aug. 8, 1939 |
| 2,490,975 | Mathy | Dec. 13, 1949 |
| 2,529,344 | Machlet | Nov. 7, 1950 |

OTHER REFERENCES

Mellor's Modern Inorganic Chemistry, 1939, page 714.

Handbook of Chemistry and Physics 32d ed., page 1521.